United States Patent [19]

Cho

[11] Patent Number: 5,997,631
[45] Date of Patent: Dec. 7, 1999

[54] HARDENER COMPOSITION FOR PRODUCING WASTE-CONTAINING SHAPED CEMENT ARTICLES AND PROCESS FOR PRODUCING SHAPED CEMENT ARTICLES USING THE HARDENER COMPOSITION

[75] Inventor: Song Yop Cho, Setagaya, Japan

[73] Assignees: Toho Corporation Co., Ltd., Tokyo; Joban Juki Kensetsu Kabushiki Kaisha, Chiba-ken, both of Japan

[21] Appl. No.: 09/263,881

[22] Filed: Mar. 8, 1999

[30] Foreign Application Priority Data

Jun. 30, 1998 [KR] Rep. of Korea ............... 98-25626

[51] Int. Cl.$^6$ ................................................ C04B 18/00
[52] U.S. Cl. .................. 106/697; 106/705; 106/725; 106/745; 106/809; 106/819; 106/823; 106/DIG. 1
[58] Field of Search ........................ 106/697, 705, 106/725, 745, 802, 809, 819, 823, DIG. 1

[56] References Cited

U.S. PATENT DOCUMENTS 5,810,922  11/1998  Okamoto et al. ................. 106/714

*Primary Examiner*—Paul Marcantoni
*Attorney, Agent, or Firm*—Wenderoth, Lind & Ponack, L.L.P.

[57] ABSTRACT

A hardener composition useful for producing shaped cement articles while utilizing wastes such as waste incineration ash or papermaking sludge incineration ash and broken concrete; and a process for producing shaped cement articles by using this hardener composition.

The process comprises kneading a hardener composition comprising 4.0 to 13.0 wt. % of sodium carbonate, 5.0 to 10.6 wt. % of potassium carbonate, 5.2 to 11.2 wt. % of sodium chloride, 1.1 to 4.1 wt. % of ammonium chloride, 0.1 to 1.5 wt. % of cobalt chloride, 0.4 to 8.6 wt. % of superplasticizer for concrete formation consisting maily of a polyalkylallyl-sulfonate salt, and 51.0 to 84.2 wt. % of water together with the wastes and cement and shaping and curing. The substances inducing secondary pollution which are contained in the wastes are prevented from dissolving away or exuding from the cement articles.

4 Claims, No Drawings

HARDENER COMPOSITION FOR PRODUCING WASTE-CONTAINING SHAPED CEMENT ARTICLES AND PROCESS FOR PRODUCING SHAPED CEMENT ARTICLES USING THE HARDENER COMPOSITION

FIELD OF THE INVENTION

This invention relates to a hardener composition which is useful for producing shaped cement articles from ingredients including wastes such as a waste incineration ash yielded in a garbage incineration plant or a papermaking sludge incineration ash, a broken concrete, etc., and to a process for producing shaped cement articles by using this hardener composition.

DESCRIPTION OF THE PRIOR ART

Shaped cement articles such as building cement blocks and paving blocks are generally produced by mixing cement and fine aggregates such as sand or stone powder with water, kneading the mixture with a mixer, and then shaping the resultant mortar in a mold, although the proportion of each ingredient slightly varies depending on the uses. Such cement articles are used in an extremely wide range of applications. However, the fine aggregates as the raw material are gradually coming to be one of the raw materials which are less available because of the problems concerning environmental protection.

On the other hand, as a result of the progress of industries and the elevated standard of living, huge amounts of garbages have come to be discharged in cities. In order to treat or discard the garbages, many garbage incineration plants and landfills are being operated.

A papermaking process in papermaking plants comprises suspending pulp in water, beating the pulp, adding various additives thereto, forming the suspension into a sheet, and drying the sheet. In this process, huge amounts of papermaking sludges are yielded.

Although the papermaking sludges are burned and the resultant ashes are buried in landfills, this treatment has a fear of causing secondary pollution because the sludges contain various organic substances and chemicals. Papermaking sludges hence fall under the category of specified industrial wastes. Consequently, papermaking plants have considerable difficulties including problems concerning the cost of the treatment.

Furthermore, huge amounts of building wastes are being discharged in city redevelopment projects, and this poses a very serious problem in city management in relation to the problem of secondary pollution caused by the above-described treatment or disposal of garbages and wastes, etc.

SUMMARY OF THE INVENTION

Accordingly, an object of this invention is to provide a hardener composition useful for producing shaped cement articles for various applications from ingredients including industrial wastes such as waste incineration ashes, whose disposal poses a problem, while diminishing their causes of secondary pollution.

Another object of this invention is to provide a process for producing shaped cement articles using this hardener composition.

Still another object of this invention is to provide a method for thus mitigating the problem of secondary pollution caused by the disposal of wastes such as waste incineration ashes and saving to 3 parts by weight of water, kneading the mixture, and then shaping and curing the mixture.

DESCRIPTION OF THE PREFERRED EMBODIMENTS

This invention will be explained below in more detail.

This invention relates to a hardener composition effective in producing shaped cement articles by mixing wastes such as a waste incineration ash yielded in a garbage incineration plant, a water purification sludge resulting from the production of drinking water, papermaking sludge incineration ash, and broken concrete with cement and water and then shaping and curing the mixture. This invention further relates to a process for producing shaped cement articles by using this hardener composition. The water purification sludge is used after being dried to a water content of 5 to 10%.

The incineration ash yielded in a waste incinerator was analyzed by the process testing method for wastes defined in Notification No. 94-57 of the Environment Agency in Korea. As a result, the waste incineration ash was ascertained to contain the substances inducing secondary pollution as shown in Table 1.

TABLE 1

| Item | Content (mg/kg) |
| --- | --- |
| Lead or lead compounds | 52.925 |
| Copper or copper compounds | 6770.0 |
| Chromium or chromium compounds | 3.400 |
| Chromium compounds | 207.250 |

(Test agency: Public Health Environment Institution of Kyong Gi Do)

The water purification sludge was analyzed by the same method as the above-described analysis method for waste incineration ashes. As a result, the water purification sludge was ascertained to contain the substances inducing secondary pollution as shown in Table 2.

TABLE 2

| Item | Content (mg/kg) |
| --- | --- |
| Lead or lead compounds | 30.375 |
| Copper or copper compounds | 14.950 |
| Mercury or mercury compounds | 0.034 |
| Cadmium or cadmium compounds | 2.275 |
| Chromium compounds | 22,950 |

(Test agency: Public Health Environment Institution of Kyong Gi Do)

In general, concrete is prepared by mixing cement, fine aggregates, coarse aggregates, and water in appropriate proportions and kneading the mixture with a concrete kneader. The paste prepared by using fine aggregates such as sand as the only aggregate is called cement mortar. Such cement mortars and concrete mortars are each constituted of three ingredients, i.e., cement, aggregate, and water, although the proportion of each ingredient varies depending on the uses. These mortars harden and hydrate to thereby form hard structures containing no water. When these structures are broken into appropriate sizes and classified, the broken concretes are reutilizable as fine or coarse aggregates for shaped cement articles.

Consequently, cement blocks can be produced by mixing waste incineration ash, broken concrete, cement, and water in appropriate proportions and then kneading and shaping the mixture.

However, the cement blocks thus produced are disadvantageous in that it is difficult to find uses for the cement blocks because of their strength and impact resistance, and that the blocks emit an offensive odor because substances inducing secondary pollution flow out therefrom. In addition, the use of these cement blocks is restricted because of the possibility that substances inducing secondary pollution might exude.

The inventor has made close investigations on the problems described above and conducted many tests. As a result, the inventor has developed a hardener composition which, during the production of shaped cement articles, functions to tenaciously and chemically bond the ingredients to each other and thereby prevents substances inducing secondary pollution from dissolving away or exuding. It has been experimentally ascertained that, in the cement articles produced with the hardener composition, the substances inducing secondary pollution can be prevented from being released therefrom. This invention has thus been accomplished.

EXAMPLES

An example of the hardener composition of this invention is as follows and a light-pink liquid.

| | |
|---|---|
| Sodium carbonate ($Na_2CO_3$) | 8.5 wt. % |
| Potassium carbonate ($K_2CO_3$) | 7.8 wt. % |
| Sodium chloride (NaCl) | 8.2 wt. % |
| Ammonium chloride ($NH_4Cl$) | 2.6 wt. % |
| Cobalt chloride ($CoCl_2$) | 0.8 wt. % |
| Superplasticizer for concrete formation consisting mainly of polyalkylallylsulfonate salt (trade name: "Mighty 700", manufactured by Kao Corp.) | 4.5 wt. % |
| Water | 67.6 wt. % |

An example of formulations used for producing shaped cement articles by using the hardener composition of this invention obtained above is as follows.

| | |
|---|---|
| Waste incineration ash | 60 parts by weight |
| Broken concrete | 40 parts by weight |
| Cement | 30 parts by weight |
| Hardener composition of the invention | 1.8 parts by weight |
| Water | 2.0 parts by weight |

The above ingredients were mixed together and kneaded, and the mixture was shaped and cured to produce cement blocks.

The obtained cement blocks were analyzed by the process testing method for wastes mentioned above. As a result, no substance was detected which might induce secondary pollution and had been released from the blocks.

Cement blocks were produced from the same ingredients as the above except that papermaking sludge incineration ash was used in place of the waste incineration ash. These cement blocks were examined for water absorption and compression strength by the method defined in KSF4004-95. The results are shown in Table 3.

TABLE 3

Water absorption and compression strength of the cement blocks containing papermaking sludge incineration ash

| Sample No. | Water absorption (%) | Compression strength (kgf/cm$^2$) |
|---|---|---|
| 1 | 15 | 217 |
| 2 | 13 | 217 |
| 3 | 15 | 206 |
| 4 | 16 | 245 |
| 5 | 13 | 257 |
| 6 | 14 | 266 |
| Standard value in KSF4005-95 | ≦20 | ≦160 |

(Test agency: Korea Institute of Construction Materials)

As apparent from the above description, the shaped cement articles according to this invention are useful as building blocks or paving blocks.

The cement blocks produced from ingredients including papermaking sludge incineration ash, finery broken concrete, and cement in combination with the hardener composition of this invention are prevented from releasing substances inducing secondary pollution. Furthermore, compared to general blocks, these blocks have the following excellent properties:

1) good lightweightness;
2) high hardness;
3) high impact strength;
4) excellent soundproofing effect;
5) cohesive force sufficient to withstand nail driving; and
6) freedom from offensive odor.

What is claimed is:

1. A hardener composition for use in producing waste-containing shaped cement articles by mixing broken concrete, cement, waste, and water and shaping the mixture, said hardener composition comprising 4.0 to 13.0 wt. % of sodium carbonate, 5.0 to 10.6 wt. % of potassium carbonate, 5.2 to 11.2 wt. % of sodium chloride, 1.1 to 4.1 wt. % of ammonium chloride, 0.1 to 1.5 wt. % of cobalt chloride, 0.4 to 8.6 wt. % of a superplasticizer for concrete formation consisting mainly of a polyalkylallylsulfonate salt, and 51.0 to 84.2 wt. % of water.

2. The hardener composition for use in producing waste-containing shaped cement articles according to claim 1, wherein the waste is one member selected from the group consisting of waste incineration ashes, papermaking sludges, and water purification sludges or a mixture of two or more of these.

3. A process for producing shaped cement articles which comprises: adding 1.4 to 5.0 parts by weight of a hardener composition comprising 4.0 to 13.0 wt. % of sodium carbonate, 5.0 to 10.6 wt. % of potassium carbonate, 5.2 to 11.2 wt. % of sodium chloride, 1.1 to 4.1 wt. % of ammonium chloride, 0.1 to 1.5 wt. % of cobalt chloride, 0.4 to 8.6 wt. % of a superplasticizer for concrete formation consisting mainly of a polyalkylallylsulfonate salt, and 51.0 to 84.2 wt. % of water to a cement mortar comprising 48 to 72 parts by weight of burned waste ash, 32 to 48 parts by weight of broken concrete, 25 to 35 parts by weight of cement, and 1 to 3 parts by weight of water, kneading the mixture, and then shaping and curing the mixture.

4. The process for producing shaped cement articles according to claim 3, wherein the cement article is a cement block or a paving block.

* * * * *